C. S. CARLBERG & T. E. RYAN.
APPARATUS FOR MAKING DENTAL CASTINGS.
APPLICATION FILED MAR. 26, 1908.
949,391.
Patented Feb. 15, 1910.
2 SHEETS—SHEET 1.
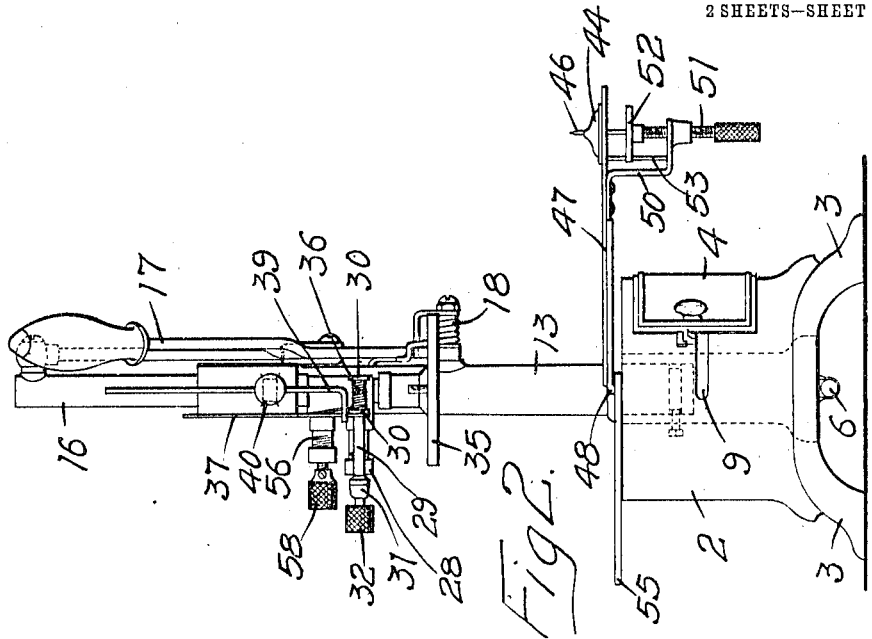
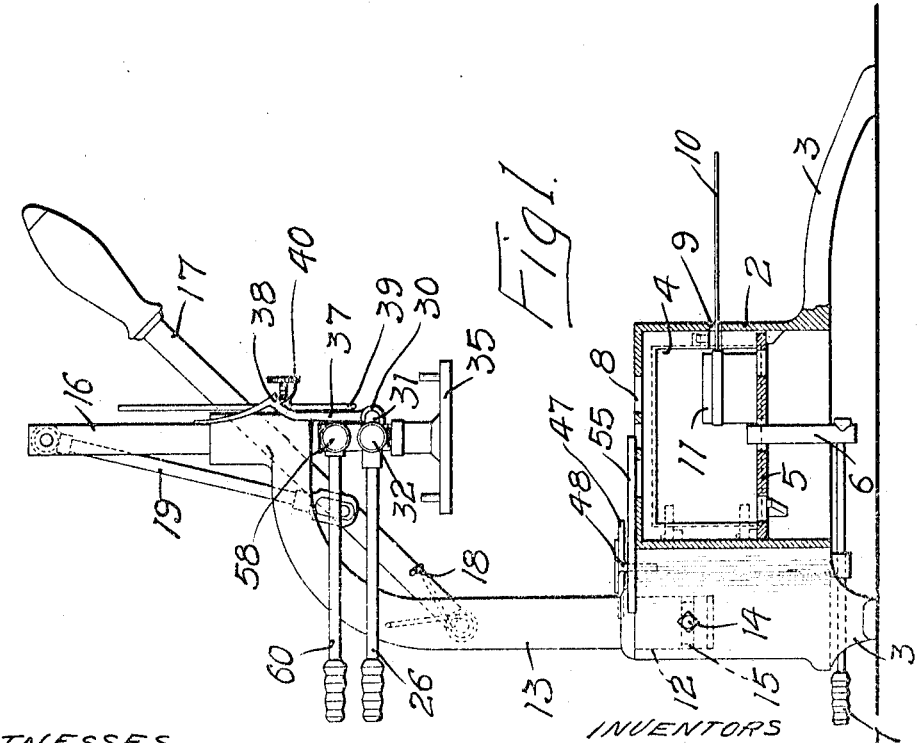
WITNESSES
INVENTORS
CARL S. CARLBERG
THEODOR E. RYAN
BY
THEIR ATTORNEYS C. S. CARLBERG & T. E. RYAN.
APPARATUS FOR MAKING DENTAL CASTINGS.
APPLICATION FILED MAR. 26, 1908.
949,391.
Patented Feb. 15, 1910.
2 SHEETS—SHEET 2.
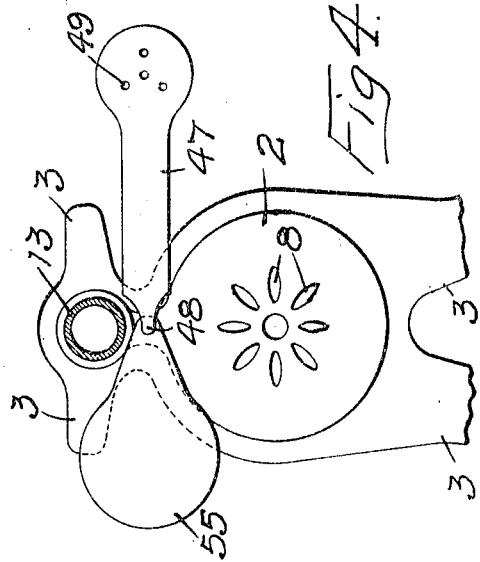
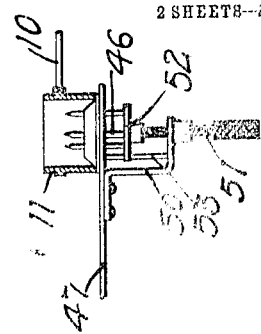
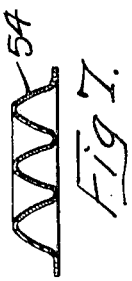
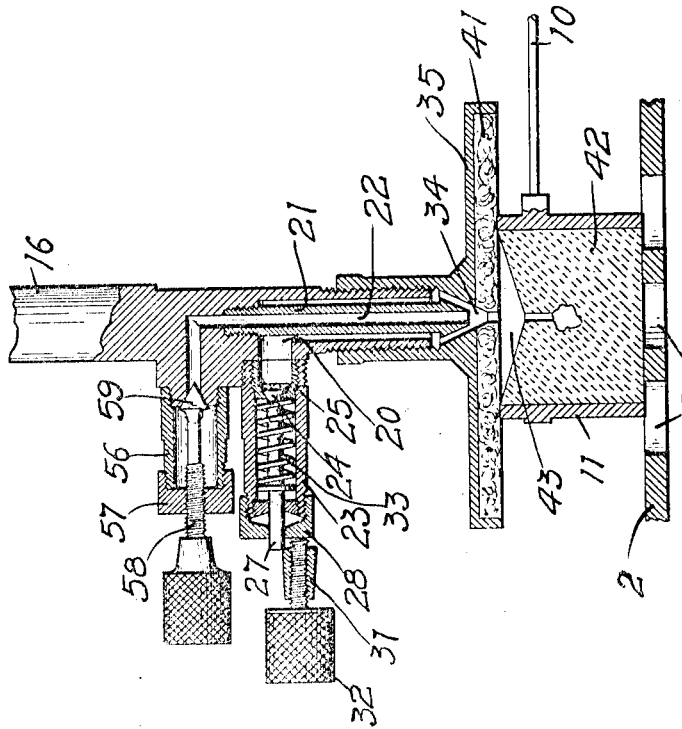
WITNESSES
INVENTORS
CARL S. CARLBERG
THEODOR E. RYAN
BY Paul & Paul
THEIR ATTORNEYS

UNITED STATES PATENT OFFICE.

CARL SAMUEL CARLBERG AND THEODOR E. RYAN, OF MINNEAPOLIS, MINNESOTA.

APPARATUS FOR MAKING DENTAL CASTINGS.

949,391. Specification of Letters Patent. Patented Feb. 15, 1910.

Application filed March 26, 1908. Serial No. 423,442.

*To all whom it may concern:*

Be it known that we, CARL S. CARLBERG, subject of the Kingdom of Sweden, and THEODOR E. RYAN, citizen of the United States of America, both residing at Minneapolis, county of Hennepin, State of Minnesota, have invented certain new and useful Improvements in Apparatus for Making Dental Castings, of which the following is a specification.

The object of our invention is to provide a machine wherein a gold inlay for a tooth filling can be easily and quickly cast.

A further object is to provide an apparatus wherein a casting on porcelain may be performed without danger of checking or otherwise damaging the porcelain.

Other objects of the invention will appear from the following detailed description.

The invention consists generally in various constructions and combinations, all as hereinafter described and particularly pointed out in the claims.

In the accompanying drawings, forming part of this specification, Figure 1 is a vertical sectional view of a dental casting machine embodying our invention. Fig. 2 is an end elevation. Fig. 3 is a detail sectional view through the top of the oven and a flask thereon, and the vertically moving head above the flask. Fig. 4 is a detail view of the top of an oven illustrating the means for supporting the flask during the operation of filling it with the investment material. Fig. 5 is a detail sectional view illustrating the means employed for forming the passage leading to the mold in the investment material. Figs. 6 and 7 illustrate caps of different form used in the bottom of the flask.

In the drawing, 2 represents an oven supported upon suitable legs 3 and having a door 4. Within the oven is a grating 5 through which a burner 6 extends, said burner communicating with a nipple 7 to which a gas pipe may be attached. The top of the oven has openings 8 therein over which the flasks are placed, and the wall of the oven has a horizontal slot 9 therein leading from the door opening to receive a handle 10 provided on the flask 11, said slot allowing the flask to be placed in the oven for drying purposes, and the door closed leaving the handle projecting outwardly through the slot. On the rear of the oven a socket 12 is provided and adapted to receive the lower end of a goose neck standard 13, said standard being capable of revolution in its socket and held in place therein by a bolt 14 fitting within an annular groove 15 in said standard. A plunger 16 is vertically slidable in the standard 13 and a lever 17 is pivoted at one end on said standard and normally held in its raised position by a spring 18, and a rod 19 is pivotally connected at one end to the plunger 16 and has a loose connection at its other end with the lever 17, whereby when the lever is depressed the plunger will be forced downward. The lower end of said plunger is provided with a passage 20 and a nozzle 21 is arranged concentrically in said passage and spaced from the walls thereof and provided with a duct 22. Said nozzle extends below the lower end of the plunger and is tapered at its discharge end. A sleeve 23 is mounted on the plunger and communicates with the passage 20, and a valve 24 has a seat 25 in said sleeve and is adapted to close the entrance to said passage.

A gas connection 26 leads into the sleeve 23 and the stem 27 of the valve projects through a cap 28 provided on the end of said sleeve. A rod 29 is mounted in lugs 30 on the plunger and carries an arm 31 in which a screw 32 is supported, said screw having a head adapted to be grasped by the fingers, and its inner end engaging the stem of the valve 24 and forcing it open against the tension of the spring 33. When this screw is operated and the valve 24 opened gas will flow freely through the pipe 26 into the passage 20 and from thence downward to a burner 34 provided in a disk 35 that is mounted on the lower end of the plunger. The rod 29 is capable of rocking in its support and the spring 36 normally tends to hold the arm 31 in position to bring the operating screw in line with the stem of the valve 24, so that when the said screw is moved the valve will be opened. A finger 37 having a cam surface 38 thereon is mounted on the rod 29 and a trip rod 39 is adjustably mounted on a post 40 and adapted to engage the cam surface 38 and rock the rod 29 when the plunger has descended a predetermined distance for the purpose of disengaging the screw 32 from the valve stem and allowing the valve spring to close it and shut off the admission of gas to the burner. This takes place automatically when the lever has been forced downward to move the disk 35 into engagement with the top of the flask.

The disk 35 has a pad 41 provided with an opening through which the flame from the burner is projected against the metal in the top of the flask. The flask is filled with suitable investment material indicated by reference 42, the wax pattern being embedded in the investment with a sprue-former leading from the pattern to the crucible 43 formed in the top of the investment material. This depression or crucible in the investment material is preferably formed by means of a cap or cover that is placed in the bottom of the flask preparatory to filling it. Caps or covers of various shapes and sizes may be provided according to the size of the flask and the number of castings that it is desired to produce at one time.

In Fig. 6 we have illustrated a cap 44 adapted for use with one pattern having a single hole 45 therein for a pin or sprue-former 46. We provide one pin for each pattern, the pointed end of the pin being inserted into the wax bearing the impression of the cavity and the pattern thus obtained is embedded in the investment material in the usual way of molding dental castings. A plate 47 is pivoted at 48 and is adapted to support the flask and has a series of holes 49 through which the pins of the sprue-former are inserted. A bracket 50 is provided on the under side of the plate 47 and a screw 51 is carried by said bracket and has a cap 52 on its upper end upon which the pins 46 rest. The cap 52 is guided vertically and held against rotary movement by a guide pin 53. By operating the screw 51 the cap 52 may be raised and lowered and the pins 46 and the patterns carried thereby adjusted to the desired elevation in the flask.

In Fig. 7 a cap 54 is illustrated having a series of holes therein to receive the sprue-former pins and support a series of patterns to enable a number of castings to be produced at the same time. A cover plate 55 is pivoted on the oven top and adapted to swing in over the openings 8 therein and close them. The duct 22 communicates at its upper end with a sleeve 56 having a cap 57 thereon wherein a stem 58 is threaded, the inner end of said stem having a valve 59 that is adapted to close the passage 22. An air inlet pipe 60 communicates with the sleeve 56, the pressure being supplied from a tank or by means of a suitable pump. By the adjustment of the valve 59 the volume of air admitted to the nozzle is controlled.

In the operation of the apparatus the flask is placed on the plate 47, the wax pattern having been obtained, and if only one casting is to be made a single pin is thrust up through a hole in the plate and into the pattern. The investment material is then packed around the pattern and upon the cover inclosed by the flask and through which the pattern supporting pin is thrust. After the investment material has been packed solidly around the pattern the flask is lifted and inverted, the pin being drawn out of the pattern leaving a passage from the bottom of the depression or cavity in the investment material leading to the pattern. The flask is then placed on the oven, and the gold for the casting laid in the depression or crucible formed in the top of the investment material. Heat is applied from above and below in the manner heretofore described, the wax pattern volatilized and the gold reduced to a molten condition. When this has been done the lever 17 is operated to depress the plunger and seat the disk on the flask and air pressure is admitted to the nozzle by the opening of the valve 59, whereupon the molten gold in the crucible will be forced down through the passage in the investment material into the mold.

We have found that by means of this apparatus an intense, uniform heat can be directed against the flask and its contents, and that a casting on porcelain may be made without danger of checking or otherwise damaging the porcelain. During the operation of casting, one or more flasks with freshly packed investment material therein may be placed in the oven for drying purposes preparatory to forming a casting.

We claim as our invention:

1. The combination, with a stationary burner and a flask support, of a movable burner between which and said stationary burner a mold flask is placed upon said support, said movable burner having a part to rest upon the top of said flask, and a pipe connection for a gas supply thereto, a fluid pressure nozzle provided within said movable burner and a valve controlling the admission of fluid pressure to said nozzle for the purpose specified.

2. The combination, with a stationary burner, and means for supporting a flask above the same, of a vertically movable burner having a part to engage the top of the flask, a pipe connection for said movable burner, a valve therefor normally closed, manually operated means for opening said valve and means for automatically tripping said opening means to allow said valve to close and shut off the supply of gas at a predetermined point in the downward movement of said movable burner.

3. The combination, with a stationary burner and means for supporting a flask above the same, of a vertically movable burner having a pipe connection for delivering gas thereto, a spring-pressed valve normally closing the passage to said burner, a plunger whereon said burner is supported, an oscillating arm carried by said plunger, means mounted in said arm and adapted to engage said valve to hold it in its open position, and means for moving said arm to release said valve and allow it to close when said plunger has reached a predetermined point in its descent.

4. In a machine of the class described, the combination, with a reciprocating plunger, of a burner carried thereby having a gas pipe connection and a valve normally closing the passage to said burner, manually operated means for locking said valve in its open position to admit gas to said burner, and means arranged during the descent of said plunger to automatically trip said locking means, and means whereby the time of said tripping operation may be varied, for the purpose specified.

5. The combination, in a machine of the class described, with a reciprocating plunger, of a burner mounted thereon and having a passage leading thereto and a gas connection and a valve for regulating the entrance of gas to said burner, a nozzle mounted in said plunger and also having a passage and a fluid pressure connection, and means for regulating the entrance of fluid pressure to said nozzle.

6. The combination, with a reciprocating plunger, of a disk carried thereby, a burner provided in the lower end of said nozzle and having an opening through said disk, and a passage communicating with the gas supply, and a valve normally closing said passage, a nozzle concentric with said burner and also having a passage leading to a source of fluid pressure, and a valve for regulating the admission of said pressure, means for temporarily opening said gas valve and means actuated by the descent of said plunger for tripping said opening means to allow said valve to close automatically and shut off the entrance of gas to said burner at a predetermined point in the stroke of the plunger.

7. In a machine of the class described, the combination, with an oven having a stationary burner in the bottom thereof, a door for said oven through which a molding flask may be inserted, the wall of said oven having a slot communicating with the door opening and adapted to receive the handle of the molding flask and permit the oven door to be closed.

8. The combination, with a stationary burner and means for supporting a molding flask above the same, of a vertically movable burner having a part to engage and close the top of the flask, a pipe connection and valve for said burner, a nozzle carried by said burner and connected with a source of fluid pressure, a fluid pressure valve, a lever device for depressing said burner and mechanism actuated by the movement of said lever for closing said burner valve and opening said fluid pressure valve at a predetermined point in the descent of said burner.

9. The combination, with a stationary burner and a flask support, of a vertically movable disk adapted to contact with and close the top of the flask, a burner carried by said disk and connected with a source of gas supply and having a suitable controlling valve mechanism for moving said disk into engagement with the top of said flask, and means for automatically shutting off the supply of gas to said burner at a predetermined point in the descent of said disk.

10. The combination with a base having a flask support, of a vertically moving plunger, a disk mounted thereon and adapted to engage and close the top of a flask resting upon said support, a burner carried by said disk and connected with a source of gas supply and having a controlling valve and mechanism for moving said disk into engagement with the top of the flask.

11. The combination, with a base having a flask support, of a rotatable standard mounted on said base and overhanging said support, a plunger vertically slidable in said standard, a disk mounted thereon, and adapted to engage and close the top of a flask resting upon said support, a burner carried by said disk connected with a source of gas supply and having a controlling valve and mechanism for moving said disk into engagement with the top of a flask.

12. The combination, with a base and a flask support thereon, of a standard overhanging said support, a plunger vertically movable in said standard, a disk carried by said plunger and adapted to engage the top of a flask resting on said support, a fluid pressure nozzle carried by said plunger and connected with a source of fluid pressure supply and having a controlling valve, mechanism for depressing said plunger and means for opening said valve at a predetermined point in the descent of said plunger and disk.

13. In a machine of the class described, the combination with a plunger, of a burner having a gas pipe connection and a controlling valve therefor, means arranged during the descent of said plunger for automatically opening said valve and means whereby the time of operation of said valve may be varied, for the purpose specified.

14. The combination with the investment ring, of a burner, means for supporting the ring directly above the burner, and means for applying pressure to the contents of the ring, said means comprising an inverted, cup-shaped receptacle adapted to engage above the investment ring, and provided with a lining of absorbent material for the purpose set forth.

15. The combination with the investment ring, of a burner below the ring, means for applying pressure to the contents of the ring, said means comprising a closure for the top of the ring and provided with a lining of absorbent material, for the purpose set forth.

16. In a machine, of the class described, a disk adapted to close the top of the flask, a burner carried by said disk, a fluid pressure nozzle concentric with said burner, and means connecting said burner and nozzle with a source of gas and fluid pressure supply.

17. In a machine of the class described, a disk adapted to close the top of the flask, a burner carried by said disk and connected with a source of gas supply, a fluid pressure nozzle also carried by said disk and connected with a source of fluid pressure supply.

18. In a machine of the class described, a disk adapted to close the top of the flask and having a vertical reciprocating movement, a burner carried by said disk and connected with a source of gas supply and having a regulating valve, a nozzle also carried by said disk and connected with a source of fluid pressure supply and also having a controlling valve and means for closing said gas supply valve and opening said fluid pressure valve during the descent of said disk, substantially as described.

In witness whereof, we have hereunto set our hands this 20th day of March 1908.

CARL SAMUEL CARLBERG.
THEODOR E. RYAN.

Witnesses:
 RICHARD PAUL,
 J. A. BYINGTON.